United States Patent [19]
Antoine et al.

[11] 4,315,723
[45] Feb. 16, 1982

[54] DEVICE FOR MOLDING INFORMATION-CARRYING DISKS

[75] Inventors: Robert Antoine; Claude Bricot; Gerard Robin, all of Paris, France

[73] Assignee: Thomson-CSF, Paris, France

[21] Appl. No.: 184,167

[22] Filed: Sep. 4, 1980

[30] Foreign Application Priority Data

Sep. 6, 1979 [FR] France .................. 79 22300

[51] Int. Cl.$^3$ .................. B29C 27/00; B24D 17/00
[52] U.S. Cl. .................. 425/110; 425/810
[58] Field of Search .................. 425/110, 810, 405 R, 425/406, 408, 409, 410, 411, 116

[56] References Cited

U.S. PATENT DOCUMENTS

| | | | |
|---|---|---|---|
| 2,452,821 | 11/1948 | Wood | 425/810 |
| 2,998,622 | 9/1961 | Renoux | 425/810 X |
| 3,112,520 | 12/1963 | George et al. | 425/405 R |
| 3,918,875 | 11/1975 | Phillipson et al. | 425/810 |
| 4,213,927 | 7/1980 | Alberti | 425/810 |
| 4,248,818 | 2/1981 | Elizabeth | 425/116 X |

FOREIGN PATENT DOCUMENTS

| | | |
|---|---|---|
| 2384404 | 10/1978 | France . |
| 7411707 | 4/1975 | Netherlands . |
| 1493115 | 11/1977 | United Kingdom . |

Primary Examiner—J. Howard Flint, Jr.
Attorney, Agent, or Firm—Oblon, Fisher, Spivak, McClelland & Maier

[57] ABSTRACT

The device of the invention allows a flexible substrate to be applied against the etched matrix with insertion therebetween of a layer of resin, the application of the substrate on the matrix taking place from the center progressively towards the periphery. It comprises support means in the form of a ring cooperating with a deformable resilient cushion of a convex shape so as to give a curved shape to the substrate at the beginning of molding then to effect the progressive application, while ensuring relative centering of the substrate and the matrix.

13 Claims, 7 Drawing Figures

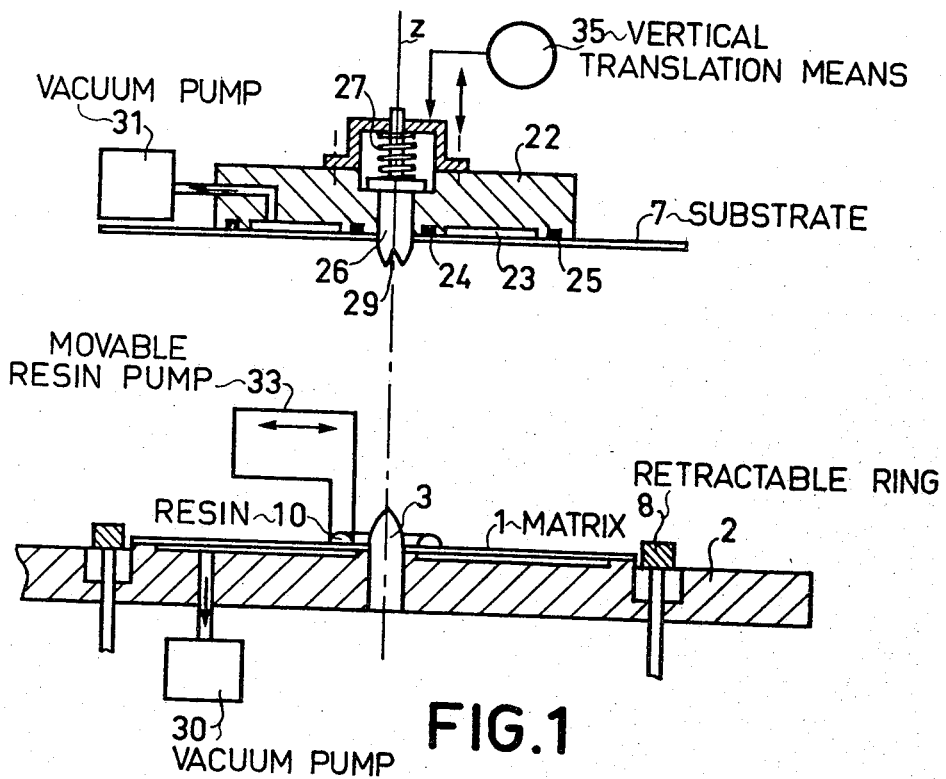
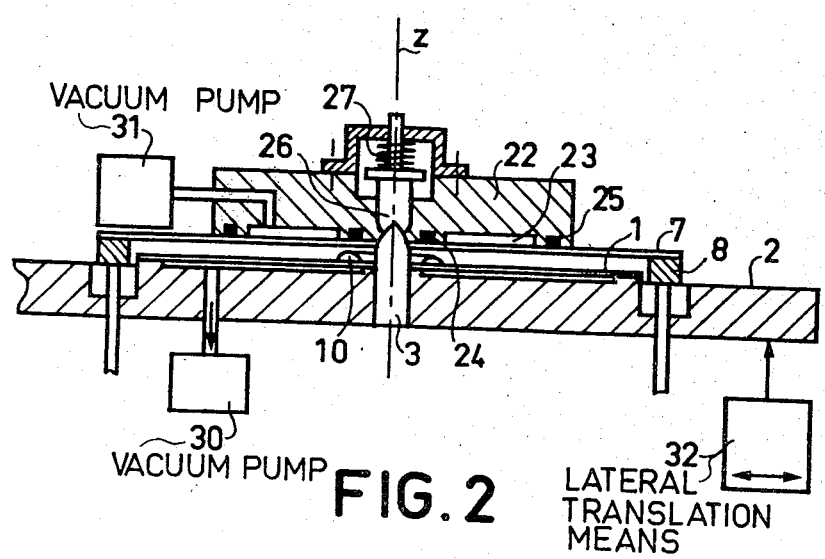

DEVICE FOR MOLDING INFORMATION-CARRYING DISKS

BACKGROUND OF THE INVENTION

The invention relates to an apparatus for producing video disks more particularly in accordance with a technique for molding a flexible substrate on a matrix carrying information in the form of microreliefs.

Optically readable video disks are generally such that the information is recorded along a spiral or concentric circle track, formed from a succession of elements whose dimensions are of the order of a micron: channels or projections according to the process. Microchannels are obtained for example by thermal ablation.

For certain applications, it may be useful to have available a more or less large number of identical copies obtained from the same original disk: either a specially etched matrix which will only serve for duplicating, or a disk capable of being recorded and read by the user.

Numerous copying processes are already known, particularly those using pressing techniques, such as those used for audio disks, which require the use for the copies of a thermo-deformable plastic material. The pressing processes well-adapted to large-scale production require heavy, cumbersome and expensive apparatus which is scarcely advantageous for small-scale production and cannot be used by the user himself.

More adapted to small-scale production are the molding processes consisting in contacting a matrix and a substrate with at least one intermediate molding agent. The apparatus is then lighter, simpler to use and inexpensive, able to be installed in any premises, such as a reprography apparatus for example, in the very place of use. Furthermore, molding does not generate mechanical stresses at the level of the relief impression and ensures a greater fidelity of reproduction than pressing. One of the problems met with is that of the inclusion of air bubbles between the matrix and the substrate. A process for molding flexible disks (floppy or semi-rigid) is described in French patent application No. 78 07 293 filed on Mar. 14, 1978 and published under the No. 2 384 404, according to which a photopolymerizable resin is deposited in a ring close to the center of the matrix, the flexible substrate is curved and applied against the resin then is progressively flattened against the matrix while driving the resin towards the periphery and avoiding the formation of air bubbles. The resin, which forms a layer of uniform thickness between the substrate and the matrix, is photopolymerized by ultraviolet radiation through the substrate and adheres then to the substrate and not to the matrix. The means for implementing this process, described in this application, comprise in particular a vacuum pump connection, so as to cause the substrate to be curved by application of a depression. To allow the substrate to be applied against the matrix, the depression is discontinued so that the substrate relaxes and is flattened on the matrix. The implementation thus described is delicate. The pressure exerted by the substrate on the matrix, with the ring of resin as intermediary, is not controlled and it is not easily maintained uniform and progressive. On the other hand, no means are provided for forming the central hole, perfectly positioned with respect to the annular recorded area.

SUMMARY OF THE INVENTION

The invention provides principally a device for molding disks using a process of this type from an original etched disk and is characterized in that it comprises support means in the form of a ring having a diameter greater than that on which the resin is deposited, the disk intended to be applied having a diameter at least equal to that of the ring, these means being mobile in the direction Z perpendicular to the plane of the first disk, so as to form a support for the periphery of the second disk and to give it its curved shape, then to back progressively away as the second disk is applied against the first one and finally to allow separation of the disks after hardening of the resin; the device being characterized furthermore in that the application of the second disk on the first is obtained by means of a deformable resilient cushion having a bearing face with a convex shape in the absence of compression, situated on the side opposite the first disk with respect to the second and movable in the direction Z so as to exert a progressive thrust on the second disk, beginning in the zone of the fillet of resin then extending towards the periphery as the support means back away, this cushion being solid with a central annulus having a diameter less than that of the ring of resin exerting a nipping effect in the center of the disk and cooperating with the support means so as to ensure the relative positioning of the two disks during the whole of the spreading phase.

DESCRIPTION OF THE DRAWINGS

Other characteristics and advantages of the invention will become clearer from the following description and the accompanying drawings in which:

FIGS. 1 to 6 illustrate the successive phases of an operation for producing a disk from a semi-rigid substrate;

DESCRIPTION OF THE PREFERRED EMBODIMENTS

Figure 3:
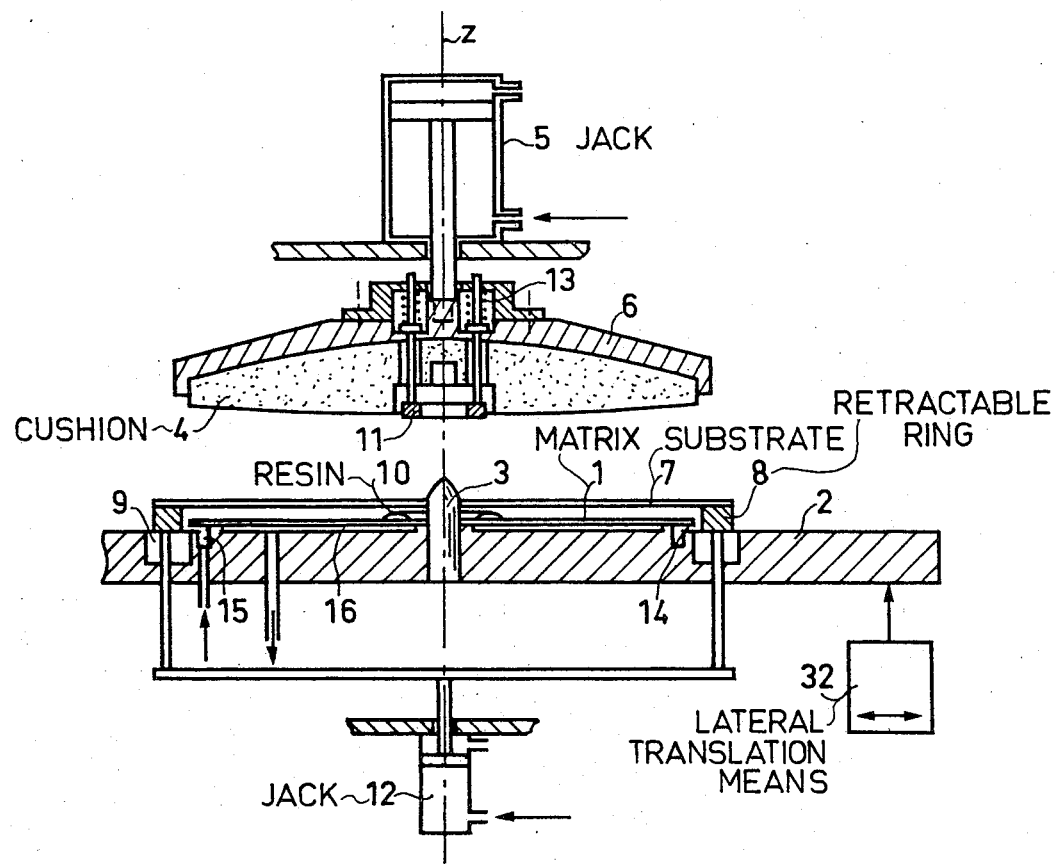

The principle of a molding operation consists in applying one against the other an original disk carrying surface microreliefs and a second disk intended to provide the copy disk by inserting between the two disks a layer of a hardenable substance. The original disk carries successive tracks engraved for example by thermal ablation along microchannels. It is desired to obtain a copy disk whose surface formed by the layer of the hardened substance reproduces the same relief in negative, i.e. according to the chosen example of the microreliefs. So as to avoid the interpositioning of a layer of a stripping agent between the original disk and the hardenable substance, which risks being locally prejudicial to the quality of the microrelief, a resin is used which is easily spreadable and which, once hardened, does not adhere to the original disk but on the contrary adheres to the copy disk. The surface of the original disk may be made from metal or from a synthetic material. The copy disk is made in a plastic substrate, for example from polyvinyl chloride, plexiglass or else from glass. Besides its qualities of adherence to the substrate and not to the original disk, the resin must be as little fragile as possible, i.e. especially not very sensitive to abrasion. It must furthermore not generate mechanical stresses in the substrate, which would result in deformations of the copy disk. To obtain the required qualities, the resin chosen in the case of a plastic substrate, may be an acrylic resin formed of monomers which may be rapidly polymerized by irradiation under ultraviolet radiation. The radiation may be applied through one of the two disks provided that this latter absorbs little thereof. Other hardenable resins may be used, for example resins formed of silicon elastomers hardenable by heating with an infrared lamp for example.

FIG. 1 illustrates the first step of a copying operation during which the two disks are placed in position. One of the two disks 1, generally the original disk, is placed on a plate 2 provided with a depression device shown schematically at 30 for maintaining disk 1 in position during the whole duration of the copying. Disk 1 has been previously provided at its center with a through-hole of predetermined diameter perfectly centered with respect to the information-carrying track. Plate 2 is integral with a central pin 3 whose dimensions are adapted to those of the hole with a very reduced clearance (about 10 microns) on which the disk is positioned. The second disk 7, in general the substrate, has a diameter slightly greater than that of the first disk so as to prevent surplus resin from subsequently creeping over the face of the substrate not intended to be etched. Disk 7 is provided at its center with a through-hole calibrated with the pin 3 and is held by a suction cup 22 through a depression chamber 23 associated with suction means 31 and limited by two annular seals 24 and 25. Suction cup 22 is vertically movable by any means 35. The whole of substrate 7 is positioned on a pin 26 retractable under the action of a spring 27. The diameter of this pin is a little smaller than that of pin 3 of plate 2. Disk 7 solid with suction cup 22 on the one hand and disk 1 solid with plate 2 on the other hand are aligned with respect to one another so that the axes of pins 3 and 26 are merged at Z. Furthermore, the end of pin 26 comprises a cone-shaped recess 29 for completing the alignment on the conical head of pin 3. Once disks 1 and 7 have been positioned, a laterally movable resin pump device 33 deposits a predetermined quantity of resin on the central part of matrix 1 in a circular fillet 10 situated slightly on this side of the minimum inscription zone. Device 33 comprises mechanical means for spreading out the resin uniformly. After this operation device 33 is released.

The following step is shown in FIG. 2. Suction cup 22 supporting substrate 7 descends with this latter, through the action of means 35, and stops when pin 26 is engaged on pin 3. Since the diameter of substrate 7 was chosen slightly greater than that of disk 1, substrate 7 comes to bear on a ring 8 external to disk 1 and raised with respect to the level of plate 2 so that the substrate is at a few millimeters from the resin fillet 10. Pin 26 is retracted into suction cup 22 by spring 27 and controls the stopping of depression device 31. Means 35 are then actuated to release suction cup 22. Plate 2 supporting the two disks 1 and 7 is then moved laterally by a carriage 32 so as to come in a position under the resin-spreading device.

This device is shown in FIG. 3. It comprises a cellular foam cushion 4 formed for example from natural rubber or elastomer in the axis of the central pin above disks 1 and 7. A seat 6 having a shape adapted to the hidden face of the cushion ensures proper seating of this latter. The cushion is held in its seat by clamping or bonding. The cushion has a lenticular shape obtained preferably by molding and it is designed to transmit a uniform pressure to the substrate in the inscription zone. The assembly of the seat and the cushion is maintained in position above disk 1 by means of a double-acting jack 5.

Figure 4:
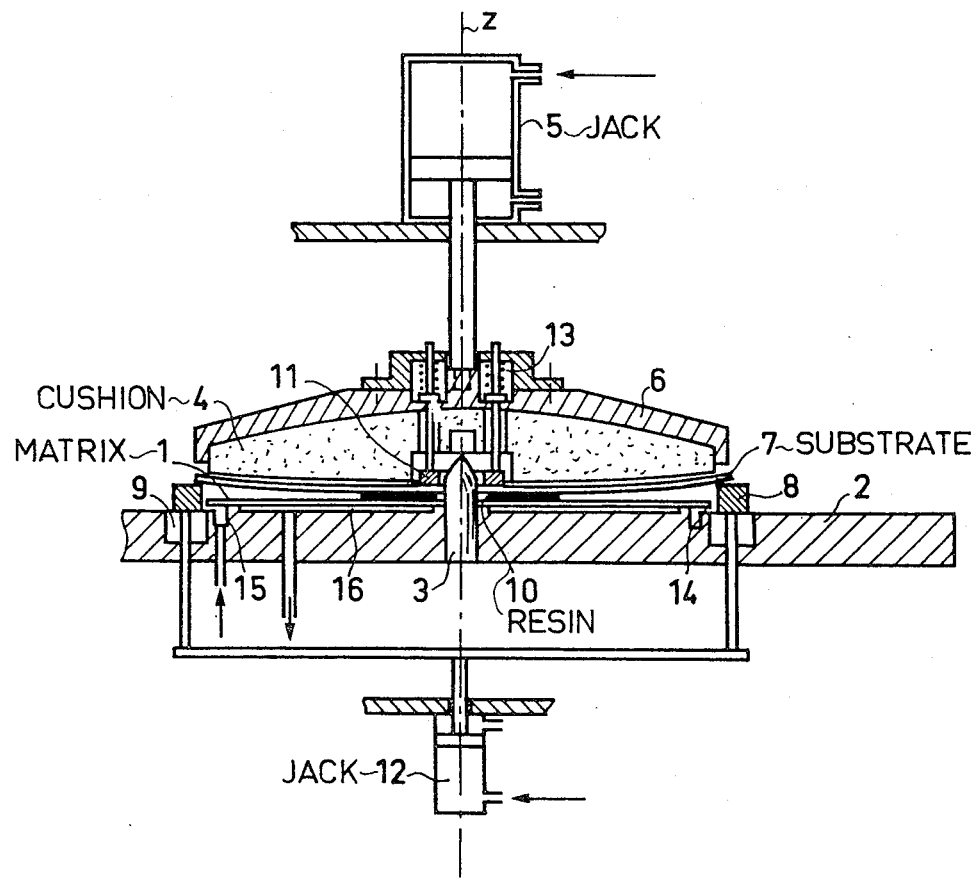
Figure 5:
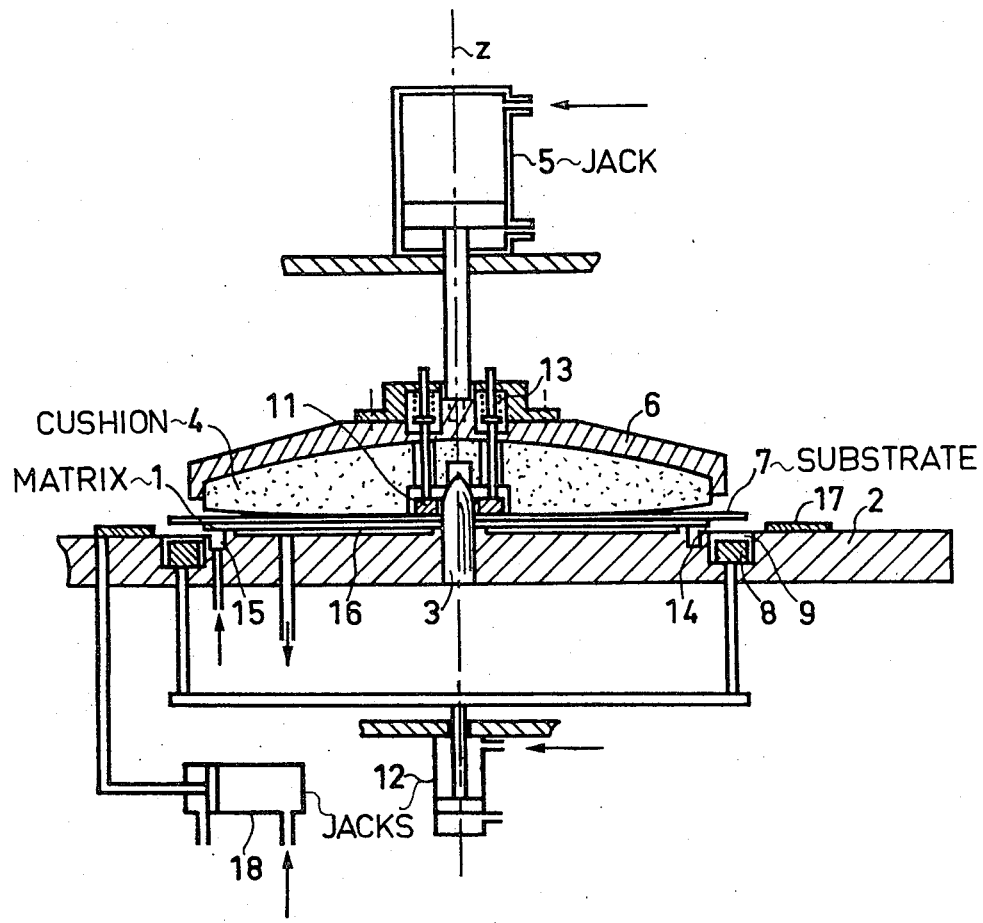

Jack 5 then controls the descent of cushion 4 along axis Z. Ring 8 which is retractable into a groove 9 provided in plate 2, for example by means of a jack 12, is at this time still in the high position. When the cushion descends, it presses substrate 7 at its center so as to crush the resin fillet 10. Ring 8 causes curving of the substrate, which can be seen in FIG. 4 illustrating the beginning of the spreading phase. From this moment, the cushion begins to be deformed from its central part while pushing the resin outwards. Gradually the support ring 8 backs away, so reducing the curvature of the substrate until this latter is completely flattened in the plane of the matrix. The end of this spreading phase is illustrated in FIG. 5. At this stage, the face of the cushion in contact with the substrate has become flat and ensures uniform pressure over the whole surface of this latter. The movement of the cushion ensures, in addition to the flattening out of the resin, a good radial distribution of the latter over the whole effective surface of the disk. A central pressing annulus 11 placed in a cavity of the cushion and urged by springs 13 is provided for exerting a pressure at the center of the disk and for ensuring in cooperation with ring 8 the relative positioning of the two disks during the whole spreading phase. Annulus 11 allows furthermore creeping of the resin towards the central pin to be prevented. This annulus, having an external diameter slightly less than the minimum inscription diameter, enters into operation at the beginning of the spreading phase and thus pushes the resin back towards the outside. A fault in the distribution of the resin between this annulus 11 and central pin 3 is without influence, since this zone is not useful. At the end of this phase, a rest time is required so as to allow a possible surplus of resin to flow towards the outside of the matrix. This excess resin flows into groove 9. A peripheral slit 14 is provided in the plate in the vicinity of the matrix and opens into a circular groove 15 where there reigns a slight overpressure, so as to push back the resin towards groove 9 and to prevent it from penetrating into the depression chamber 16 situated between plate 2 and disk 1.

Figure 6:
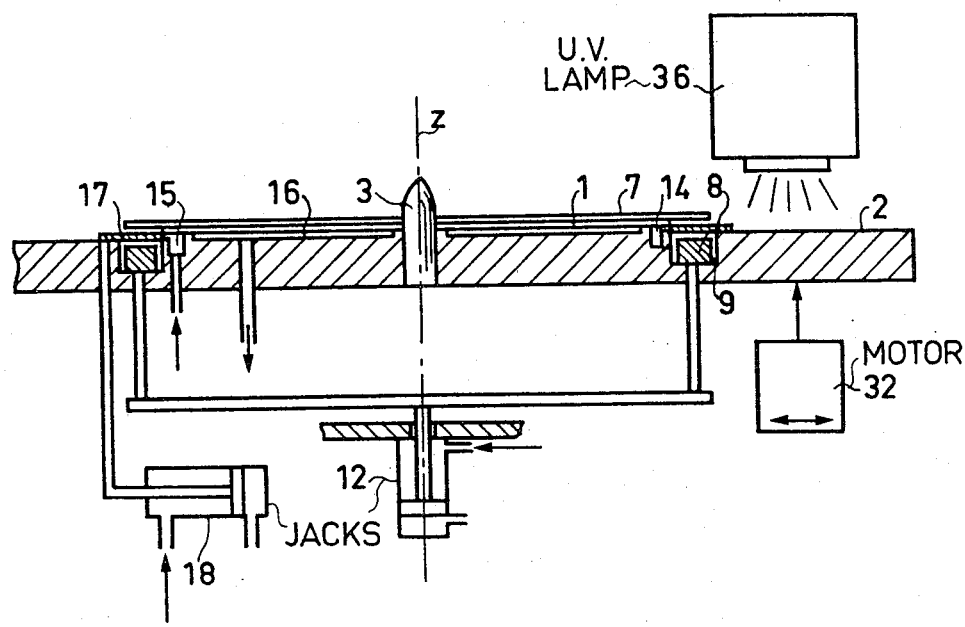

After said rest time, the cushion rises again and carriage 32 actuates plate 2 carrying disks 1 and 7 and moves it under an ultraviolet lamp 36, as shown in FIG. 6. At the same time, a masking screen 17, movable radially by means of a jack 18 for example, protects from exposure the excess resin contained in groove 9. The speed of movement of the disks under lamp 36 and the distance between these disks and the lamp are chosen appropriately depending on the nature of the resin used so as to obtain hardening by polymerization of this resin through the transparent disk 7. Then screen 17 is withdrawn and support ring 8 rises again under the action of jack 12 so as to cause separation of substrate 7 on which the resin adheres. To facilitate this separation, it may be envisaged, after polymerization, to again place disks 1 and 7 under cushion 4 and to actuate this cushion so as to exert a pressure in the center of the disk in order to prevent disk 1 from rising off its support 2 if the depression device 30 is not sufficient to hold it.

By way of indication, jack 5 exerts a force of about 400 kg. The device allows molding of semi-rigid disks having a thickness of about 1.5 millimeters, very regular so as to avoid any aberration problem in the optical recording-reading system and a diameter for example of 35 cm. The resin dispenser 33 deposits about 3 to 4 cm$^3$ of resin. At the end of the copying operation, the layer of resin has a thickness of about 10 microns, this latter depends particularly on the pressure exerted by jack 5 and on the speed thereof. It is advantageous to provide two operating speeds: a rapid speed for bringing the jack closer until it is flush with the resin fillet, then a much slower speed related to the viscosity of the resin so as to avoid bubbles during spreading out.

A variation of the apparatus described above consists in inverting the natures of disks 1 and 7. This variation is made necessary when the substrate is too rigid to undergo bending, for example when this disk is made from glass, which is the case particularly for applications of video disks in data processing. In this case of course the resin is not of the same type as in the case of the plastic substrate. The rigid substrate, then forming disk 1, is positioned about pin 3. The original disk forming disk 7 must be flexible, for example formed from nickel of a thickness of 400 microns.

Figure 7:
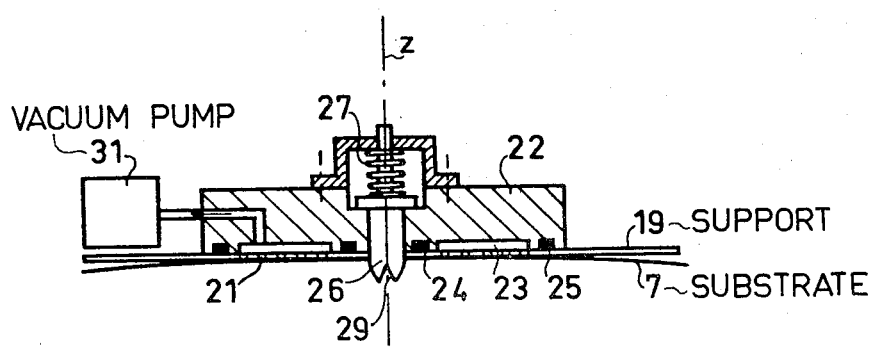
FIG. 7 shows a variation of the apparatus of the invention in the case of a flexible substrate.

Another variation of the invention concerns the case where the substrate is floppy, i.e. its thickness is much smaller than in the preceding case, for example about 150 microns. In this case, it is useful to ensure a certain rigidity so as to avoid folds. FIG. 7 shows in the first phase of production substrate 7 carried by its suction cup 22. An insert support 19 is used having a diameter corresponding to that of the disk, made for example from transparent plastic material which is placed between suction cup 22 and substrate 7. The insert 19 is perforated with small holes 21 in an annular zone for example between 50 and 200 millimeters. These holes serve for sucking the substrate onto the insert by means of the depression device 31. A clearance between the axial holes of insert 19 and substrate 7 facilitates the transfer of these two disks when they are deposited on bearing ring 8. The substrate suspended under the suction cup sags slightly due to the weight of the part of the substrate not subjected to the depression. This sag has no influence during the descent of bearing ring 8, it disappears in contact therewith. During spreading out, insert 19 allows slight sliding with respect to the substrate, which avoids the formation of folds, facilitates spreading out and the distribution of the resin between matrix and substrate.

What is claimed is:

1. A device for molding disks carrying information in the form of surface microreliefs and formed from a substrate disk and a layer of resin carrying the microreliefs, making use of the spreading out of a fillet of fluid resin between an etched matrix disk and the substrate disk, comprising means for depositing this resin fillet in the center of one of the disks, spreading means for applying the flexible second disk against the resin, this second disk being first of all curved then progressively flattened against the first one while pushing back the resin towards the periphery, and means for hardening the resin layer thus formed between the two disks, comprising furthermore support means in the form of a ring having a diameter greater than that of the first disk, the second disk having a diameter at least equal to that of the ring, these means being movable in the direction Z perpendicular to the plane of the first disk, so as to form a support for the periphery of the second disk and to give it its curved shape then to back away progressively as the second disk is applied against the first one, and finally to allow separation of the disks after hardening of the resin; the spreading means comprising a deformable resilient cushion having a bearing face with a convex shape in the absence of compression, situated on the side opposite the first disk with respect to the second and movable in direction Z so as to exert a progressive thrust on the second disk, beginning in the zone of the resin fillet then extending towards the periphery as the support means back away, this cushion being solid with a central annulus having a diameter less than that of the ring of resin exerting a nipping effect at the center of the disk and cooperating with the support means so as to ensure the relative positioning of the two disks during the whole of the spreading phase.

2. The device as claimed in claim 1, wherein there is further provided a plate associated with a suction device for maintaining the first disk in position.

3. The device as claimed in claim 2, wherein the support means are retractible into a groove provided in the plate, this groove receiving the possible excess of resin.

4. The device as claimed in claim 3, wherein there is further provided a laterally movable masking screen for masking the groove during exposition.

5. The device as claimed in any one of claims 1 to 4, wherein the first disk is the original disk and the second is a blank substrate pre-cut and perforated at its center with a hole having the same dimensions and tolerances as that of the original disk.

6. The device as claimed in claim 5, wherein the substrate is semi-rigid.

7. The device as claimed in claim 5, wherein the substrate is floppy and is held in place by an insert disk.

8. The device as claimed in any one of claims 1 to 4, wherein the first disk is a blank pre-cut substrate and the second disk is the original disk fashioned so as to be flexible.

9. The device as claimed in 5, wherein there is further provided means for aligning the centers of the holes of the two disks.

10. The device as claimed in claim 6, wherein there is further provided means for aligning the centers of the holes of the two disks.

11. The device as claimed in claim 7, wherein there is further provided means for aligning the centers of the holes of the two disks.

12. The device as claimed in claim 8, wherein there is further provided means for aligning the centers of the holes of the two disks.

13. The device as claimed in claim 3, wherein the resin being photopolymerizable, there is further provided an ultraviolet lamp which insures the polymerization of the resin, the second disk being transparent to ultraviolet radiation.

* * * * *